United States Patent
Sakane et al.

(10) Patent No.: US 9,611,775 B2
(45) Date of Patent: Apr. 4, 2017

(54) CATALYTIC CONVERTER HOLDING MATERIAL

(75) Inventors: Tadashi Sakane, Tokyo (JP); Hiroshi Makabe, Tokyo (JP)

(73) Assignee: Nichias Corporation, Tokyo (JP)

( * ) Notice: Subject to any disclaimer, the term of this patent is extended or adjusted under 35 U.S.C. 154(b) by 310 days.

(21) Appl. No.: 14/234,906

(22) PCT Filed: Jul. 4, 2012

(86) PCT No.: PCT/JP2012/067090
§ 371 (c)(1),
(2), (4) Date: Apr. 30, 2014

(87) PCT Pub. No.: WO2013/015083
PCT Pub. Date: Jan. 31, 2013

(65) Prior Publication Data
US 2014/0342115 A1    Nov. 20, 2014

(30) Foreign Application Priority Data

Jul. 25, 2011    (JP) .................................. 2011-162472

(51) Int. Cl.
*B32B 3/00*    (2006.01)
*B32B 5/02*    (2006.01)
(Continued)

(52) U.S. Cl.
CPC .......... *F01N 3/2857* (2013.01); *B29C 70/688* (2013.01); *D04H 1/4209* (2013.01); *F01N 3/2864* (2013.01); *B01D 53/88* (2013.01); *B01D 53/9454* (2013.01); *B29L 2031/14* (2013.01); *Y02T 10/22* (2013.01); *Y10T 428/192* (2015.01)

(58) Field of Classification Search
None
See application file for complete search history.

(56) References Cited

U.S. PATENT DOCUMENTS

| | | | | |
|---|---|---|---|---|
| 5,882,608 | A | * | 3/1999 | Sanocki ............. B01D 53/9454 422/179 |
| 2011/0036063 | A1 | * | 2/2011 | Kumar ................... B01D 53/88 55/486 |

FOREIGN PATENT DOCUMENTS

| JP | 2003-262117 | 9/2003 |
|---|---|---|
| JP | 2004-124719 | 4/2004 |

(Continued)

OTHER PUBLICATIONS

International Preliminary Report on Patentability and Written Opinion of the Searching Authority, Jan. 24, 2014, issued in Int'l Appl. No. PCT/JP2012/067090.

*Primary Examiner* — David Sample
*Assistant Examiner* — Nicole T Gugliotta
(74) *Attorney, Agent, or Firm* — Steptoe & Johnson LLP

(57) ABSTRACT

A catalytic converter holding mat that is inexpensive, and exhibits an excellent heat insulation capability is provided by utilizing an inexpensive heat insulating material that exhibits an excellent heat insulation capability. The catalytic converter holding mat is provided in a gap between a tubular catalyst carrier and a casing that houses the catalyst carrier, and includes a retaining section that is formed of first inorganic fibers having a thermal shrinkage ratio at 1000° C. of 1% or less, and an insulation section that is disposed adjacent to the retaining section, and formed of second inorganic fibers having a thermal shrinkage ratio at 1000° C. of more than 1%.

19 Claims, 5 Drawing Sheets

(51) Int. Cl.
*B32B 17/02* (2006.01)
*B27N 3/10* (2006.01)
*F01N 3/28* (2006.01)
*D04H 1/4209* (2012.01)
*B29C 70/68* (2006.01)
B01D 53/88 (2006.01)
B29L 31/14 (2006.01)
B01D 53/94 (2006.01)

(56) References Cited

FOREIGN PATENT DOCUMENTS

| WO | WO 97/48889 A1 | 12/1997 |
| WO | WO 2007/044485 A1 | 4/2007 |
| WO | WO 2010/024920 A1 | 3/2010 |

* cited by examiner

CATALYTIC CONVERTER HOLDING MATERIAL

This application is a national stage entry of International Application No. PCT/JP2012/067090, filed Jul. 4, 2012, designating the U.S., and which claims the benefit of Japanese Application No. 2011-162472, filed Jul. 25, 2011.

TECHNICAL FIELD

The invention relates to a catalytic converter holding mat. In particular, the invention relates to a catalytic converter holding mat that is provided in the gap between a catalyst carrier and a casing that houses the catalyst carrier.

BACKGROUND ART

A catalytic converter includes a catalyst carrier that is formed of a ceramic or the like and supports a catalyst for purifying unburned hydrocarbons (HC), nitrogen oxides (NOx), and the like contained in exhaust gas, a casing that is formed of a metal or the like and houses the catalyst carrier, and a catalytic converter holding mat that is positioned in the gap between the catalyst carrier and the casing and retains the catalyst carrier.

The catalytic converter holding mat is provided to retain the catalyst carrier inside the casing. The catalytic converter holding mat is also used to prevent leakage of exhaust gas through the gap between the catalyst carrier and the casing. Specifically, the catalytic converter holding mat is required to exhibit a cushioning capability for protecting the catalyst carrier from vibrations applied from the outside, an exhaust gas sealing capability, and the like.

For example, Patent Document 1 discloses a catalytic converter holding mat that is used for an internal combustion engine exhaust gas purification apparatus wherein a retention mat that includes inorganic fibers is wound around the outer circumferential surface of a carrier, and the carrier is retained inside a case through the retention mat in a state in which the retention mat is compressed in the thickness direction. The retention mat that is used as a catalytic converter holding mat is provided with a high-density part over the entire circumferential surface in at least one part of the exhaust gas purification apparatus in the axial direction, the high-density part having a density higher than that of the remaining part.

Patent Document 2 discloses a catalytic converter holding mat that is provided in a catalytic converter that includes a tubular catalyst carrier, a casing that houses the catalyst carrier, and a catalytic converter holding mat that is fitted to the catalyst carrier and provided in the gap between the catalyst carrier and the casing, the catalytic converter holding mat being produced by molding inorganic fibers in the shape of a mat or a cylinder, and characterized in that the basis weight is set to be smaller than that of the remaining area on at least the exhaust gas entrance-side end over a specific length in the axial direction.

RELATED-ART DOCUMENT

Patent Document

Patent Document 1: JP-A-2003-262117
Patent Document 2: JP-A-2004-124719

SUMMARY OF THE INVENTION

Technical Problem

A known catalytic converter holding mat is provided in the catalytic converter to cover the entire outer side of the catalyst carrier in the axial direction. Since a catalytic converter holding mat is subjected to a high temperature, a material that forms the catalytic converter holding mat is required to exhibit high heat resistance. This results in an increase in cost. When providing the catalytic converter holding mat in the catalytic converter to cover the entire outer side of the catalyst carrier in the axial direction, it is necessary to increase the size of the catalytic converter holding mat. As a result, the cost of the catalytic converter holding mat increases.

In order to deal with the above problem, the catalytic converter holding mat may be provided to cover the entire circumferential surface of only part of the outer side of the catalyst carrier in the axial direction. This makes it possible to reduce the cost of the catalytic converter holding mat. However, when the catalyst carrier is retained inside the casing in such a manner, a layer (air layer) in which the catalytic converter holding mat is not present is formed in part of the outer side of the catalyst carrier in the axial direction. Since such an air layer allows heat convection, the temperature of the casing significantly increases when a high-temperature gas passes through the catalytic converter.

The inventors of the invention conducted extensive studies in order to produce a catalytic converter holding mat using a heat insulating material that has been considered to be unsuitable for a catalytic converter holding mat due to a low heat-resistant temperature, but exhibits an excellent heat insulation capability and is inexpensive.

An object of the invention is to provide a catalytic converter holding mat that is inexpensive and exhibits an excellent heat insulation capability by utilizing a heat insulating material that has been considered to be unsuitable for a catalytic converter holding mat due to a low heat-resistant temperature, but exhibits an excellent heat insulation capability and is inexpensive.

Solution to Problem

According to one aspect of the invention, a catalytic converter holding mat is provided in a gap between a tubular catalyst carrier and a casing that houses the catalyst carrier, and includes: a retaining section that is formed of first inorganic fibers having a thermal shrinkage ratio at 1000° C. of 1% or less; and an insulation section that is disposed adjacent to the retaining section, and formed of second inorganic fibers having a thermal shrinkage ratio at 1000° C. of more than 1%.

The first inorganic fibers having a thermal shrinkage ratio at 1000° C. of 1% or less may be selected from the group consisting of alumina fibers, mullite fibers, and mixed fibers thereof. The first inorganic fibers having a thermal shrinkage ratio at 1000° C. of 1% or less may be fibers prepared by heating and shrinking fibers selected from the group consisting of aluminosilicate fibers, silica fibers, soluble fibers, and mixed fibers of two or more fibers among these fibers. The second inorganic fibers having a thermal shrinkage ratio at 1000° C. of more than 1% may be selected from the group consisting of glass fibers, rock wool, aluminosilicate fibers, silica fibers, soluble fibers, and mixed fibers of two or more fibers among these fibers.

The catalytic converter holding mat may further include a protecting section that is disposed between the insulation section and an outer side of the catalyst carrier. The protecting section may be formed of third inorganic fibers having a thermal shrinkage ratio at 1000° C. of 1% or less. The third inorganic fibers having a thermal shrinkage ratio at 1000° C. of 1% or less may be selected from the group consisting of alumina fibers, mullite fibers, and mixed fibers thereof. The third inorganic fibers having a thermal shrinkage ratio at 1000° C. of 1% or less may be fibers prepared by heating and shrinking fibers selected from a group consisting of aluminosilicate fibers, silica fibers, soluble fibers, and mixed fibers of two or more fibers among these fibers. The insulation section may be covered with the protecting section.

According to another aspect of the invention, a method for producing a catalytic converter holding mat includes: producing an insulation section formed of second inorganic fibers having a thermal shrinkage ratio at 1000° C. of more than 1%; preparing a slurry that comprises first inorganic fibers having a thermal shrinkage ratio at 1000° C. of 1% or less; disposing the insulation section in a mold, providing the slurry to cover the insulation section disposed in the mold, and performing dehydration molding to obtain a composite mat in which the insulation section is covered with the first the inorganic fibers; and drying the composite mat.

Advantageous Effects of the Invention

The invention thus provides a catalytic converter holding mat that is inexpensive and exhibits an excellent heat insulation capability by utilizing a heat insulating material that has been considered to be unsuitable for a catalytic converter holding mat due to a low heat-resistant temperature, but exhibits an excellent heat insulation capability and is inexpensive.

DESCRIPTION OF EMBODIMENTS

Figure 1:
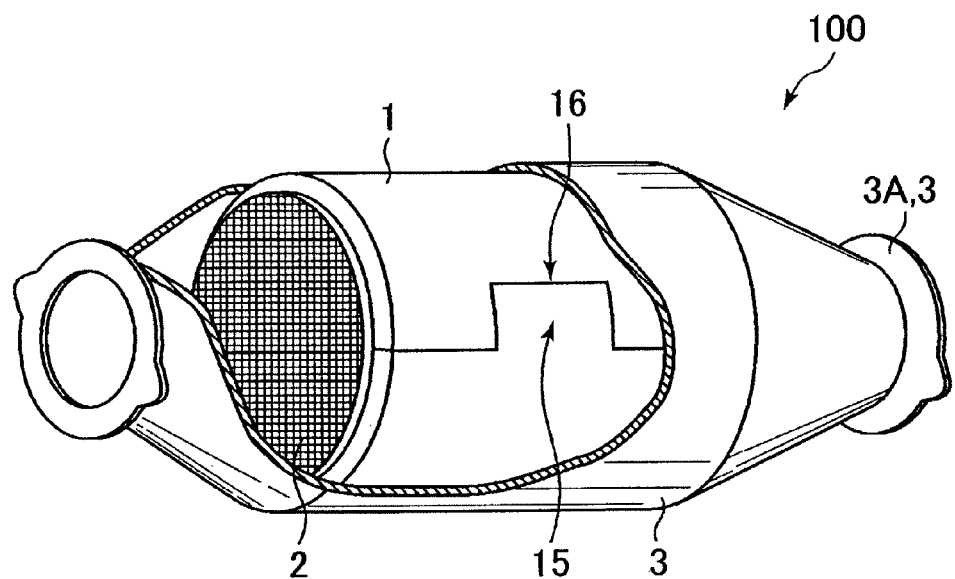
FIG. 1 is a view illustrating a state in which a catalytic converter holding mat according to one embodiment of the invention is provided in a catalytic converter.
Figure 2:
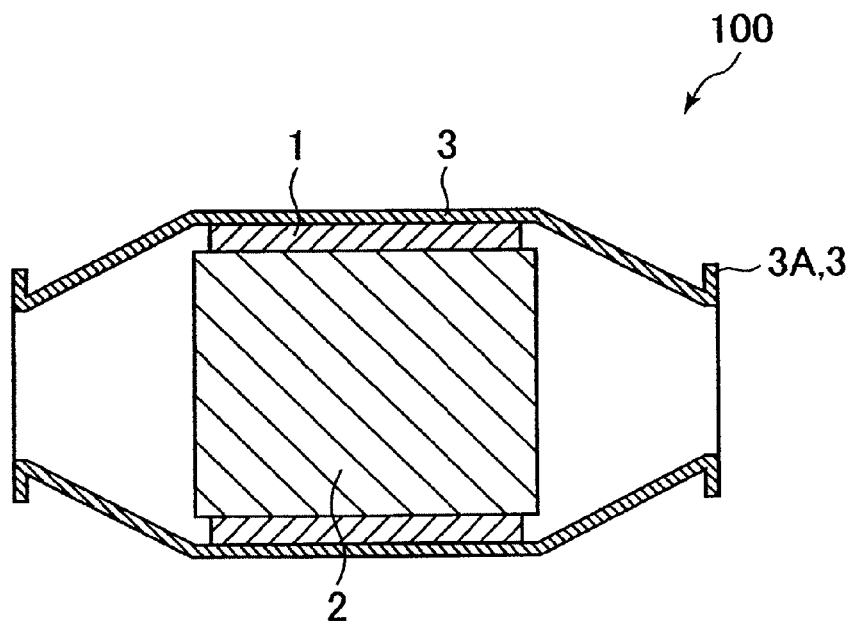
FIG. 2 is a cross-sectional view illustrating the cross section (along the axial direction) of a catalytic converter that includes a catalytic converter holding mat according to one embodiment of the invention.
Figure 3:
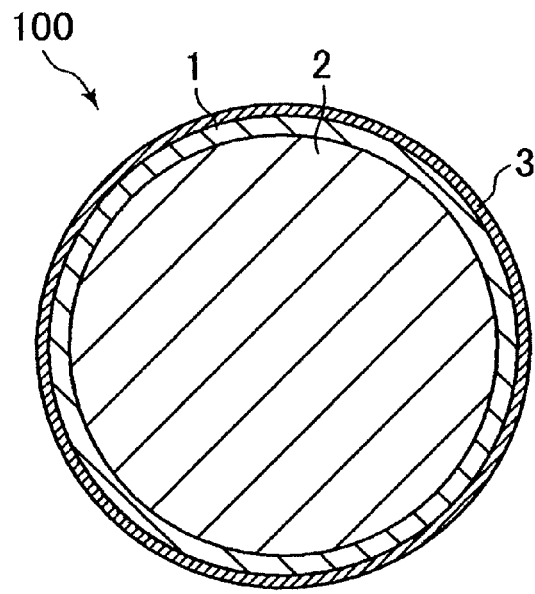
FIG. 3 is a cross-sectional view illustrating the cross section (along the circumferential direction) of a catalytic converter that includes a catalytic converter holding mat according to one embodiment of the invention.

A catalytic converter holding mat 1 according to several exemplary embodiments of the invention is described below. FIG. 1 is a view illustrating a state in which a catalytic converter holding mat 1 according to one embodiment of the invention is provided in a catalytic converter 100. FIG. 2 is a cross-sectional view illustrating the cross section (along the axial direction) of the catalytic converter 100 that includes the catalytic converter holding mat 1 according to one embodiment of the invention. FIG. 3 is a cross-sectional view illustrating the cross section (along the circumferential direction) of the catalytic converter 100 that includes the catalytic converter holding mat 1 according to one embodiment of the invention. As illustrated in FIGS. 1 to 3, the catalytic converter holding mat 1 according to one embodiment of the invention is provided in the gap between a tubular catalyst carrier 2 and a casing 3 that houses the catalyst carrier 2.

The catalyst carrier 2 illustrated in FIGS. 1 to 3 supports a catalyst for purifying unburned hydrocarbons (HC), nitrogen oxides (NOx), and the like contained in exhaust gas, for example. The catalyst carrier 2 includes a honeycomb structure that is formed of a ceramic and has a small thickness, for example. The casing 3 illustrated in FIGS. 1 to 3 is made of a metal such as stainless steel (SUS), for example.

Figure 4:
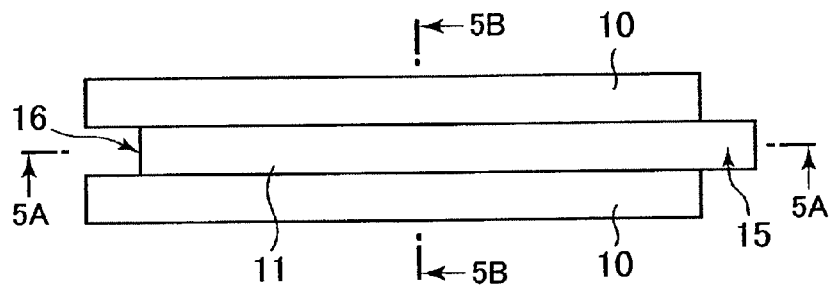
FIG. 4 is a plane view illustrating a catalytic converter holding mat according to one embodiment of the invention.
Figure 5A:
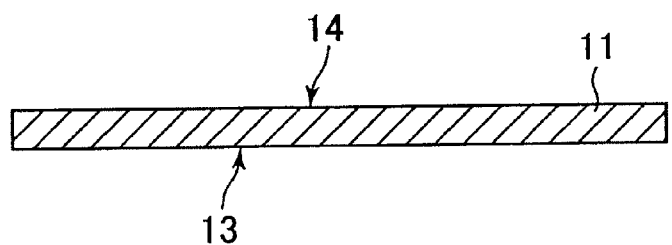
FIG. 5A is a cross-sectional view taken along the line 5A-5A illustrated in FIG. 4.
Figure 5B:
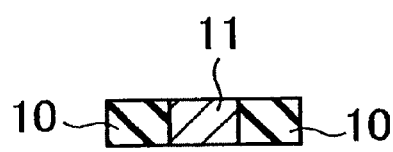
FIG. 5B is a cross-sectional view taken along the line 5B-5B illustrated in FIG. 4.

FIG. 4 is a plan view illustrating the catalytic converter holding mat 1 according to one embodiment of the invention. FIG. 5A is a cross-sectional view taken along the line 5A-5A illustrated in FIG. 4. FIG. 5B is a cross-sectional view taken along the line 5B-5B illustrated in FIG. 4. As illustrated in FIG. 4, the catalytic converter holding mat 1 according to one embodiment of the invention includes a retaining section that is formed of first inorganic fibers having a thermal shrinkage ratio at 1000° C. of 1% or less, and an insulation section that is disposed adjacent to the retaining section, and formed of second inorganic fibers having a thermal shrinkage ratio at 1000° C. of more than 1%.

As illustrated in FIG. 4, the catalytic converter holding mat 1 according to one embodiment of the invention has a configuration in which two retaining sections 10 are provided on either side of one insulation section 11. The insulation section 11 may be disposed adjacent to the retaining section 10. Specifically, the insulation section 11 may be disposed to come in contact with, or be close to, the retaining section 10. When the insulation section 11 is disposed to be close to the retaining section 10, a protecting section (described later) or the like may be disposed between the insulation section and the retaining section. The retaining section may be disposed at two or more positions. It is preferable that the retaining sections be disposed symmetrically the longitudinal direction of the catalytic converter holding mat 1 (see FIG. 4). For example, the retaining sections may be disposed symmetrically with respect to the line 5A-5A illustrated in FIG. 4.

The thermal shrinkage ratio is determined using a common heating test for a fibrous heat insulating material. Specifically, a cubic specimen having an appropriate size (normally 40 to 50 mm) is provided, and alumina pins are embedded in the specimen at a position about 10 mm inward from each end face of the specimen. The alumina pins are embedded so that the head of the alumina pin is level with the surface of the specimen. The specimen is normally heated using a gradual heating/gradual cooling method. For example, the specimen is heated in an electric furnace at a rate of about 200° C./hr, held at a given temperature (e.g., 1000° C. when determining the thermal shrinkage ratio at 1000° C.) for a given time (e.g., 8 hours), and allowed to cool in the furnace. The length $L_1$ between the alumina pins before heating, and the length $L_2$ between the alumina pins after heating are measured using calipers or the like. The thermal shrinkage ratio is calculated by the following expression.

$$\text{Thermal shrinkage ratio} = (L_1 - L_2)/L_1 \times 100 \text{ (\%)}$$

As illustrated in FIG. 4, the catalytic converter holding mat 1 according to one embodiment of the invention may have a configuration in which a protrusion 15, and a recess 16 that is shaped to be fitted to the protrusion 15 are respectively formed at one end and the other end of the tabular catalytic converter holding mat 1. The shape of the protrusion 15 and the recess 16 may be rectangular (see FIG. 4), triangular, or semicircular. The number of protrusions 15 and the number of recesses 16 may be one or two or more.

The details of the retaining section 10 and the insulation section 11 included in the catalytic converter holding mat 1 according to one embodiment of the invention are described later. One side 13 of the catalytic converter holding mat 1 according to one embodiment of the invention illustrated in FIG. 5A is a side that comes in contact with the catalyst carrier 2, and the other side 14 of the catalytic converter holding mat 1 is a side that comes in contact with the casing 3. Specifically, the retaining section 10 and the insulation section 11 may be provided to come in contact with the inner side of the casing 3 and the outer side of the catalyst carrier 2.

Figure 6:
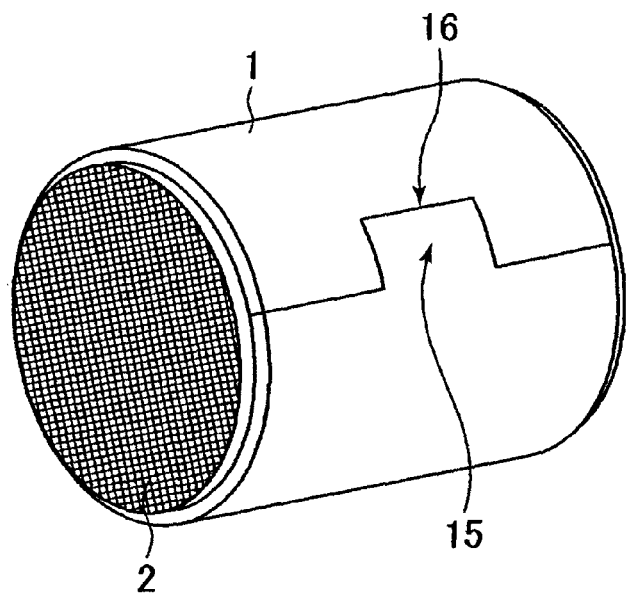
FIG. 6 is a view illustrating a state in which a catalytic converter holding mat according to one embodiment of the invention is wound around the outer side of a catalyst carrier.

FIG. 6 is a view illustrating a state in which the catalytic converter holding mat 1 according to one embodiment of the invention is wound around the outer side of the catalyst carrier 2. As illustrated in FIG. 6, the catalytic converter holding mat 1 according to one embodiment of the invention is wound around the outer side of the catalyst carrier 2 in a state in which the protrusion 15 is fitted into the recess 16.

As illustrated in FIG. 6, the distance from the protrusion 15 to the recess 16 of the catalytic converter holding mat 1 corresponds to the perimeter of the tubular catalyst carrier 2, and the direction orthogonal to the direction from the protrusion 15 to the recess 16 corresponds to the axial direction of the catalyst carrier 2. In FIG. 6, the entire side 13 of the catalytic converter holding mat 1 comes in contact with the catalyst carrier 2.

Figure 7:
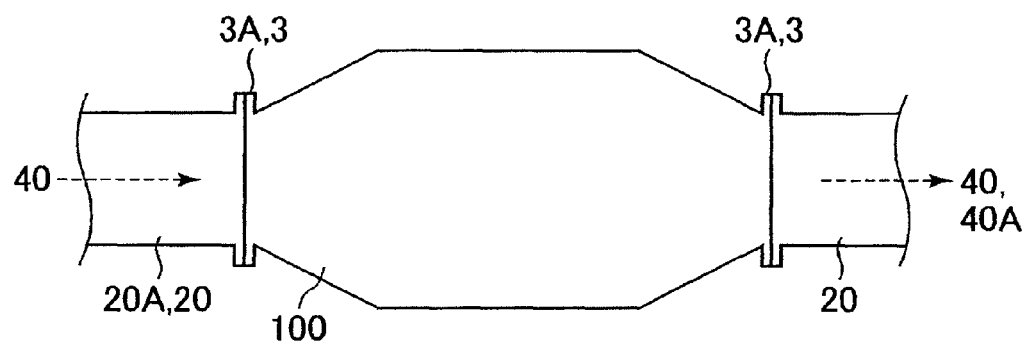
FIG. 7 is a view illustrating an example of the arrangement of a catalytic converter that includes catalytic converter holding mat according to one embodiment of the invention.

FIG. 7 is a view illustrating an example of the arrangement of the catalytic converter 100 that includes the catalytic converter holding mat 1 according to one embodiment of the invention. As illustrated in FIG. 7, the catalytic converter 100 is connected to a pipe 20 through a flange 3A included in the casing 3.

A high-temperature gas (e.g., exhaust gas 40) passes through the catalytic converter 100 in the direction from one end to the other end. For example, when the catalytic converter 100 is used for an automobile, the high-temperature gas that passes through the catalytic converter 100 is the exhaust gas 40 that is discharged from an internal combustion engine or the like, and the temperature of the exhaust gas 40 may reach 1000° C. depending on the internal combustion engine. The following description is given on the assumption that the high-temperature gas that passes through the catalytic converter 100 that includes the catalytic converter holding mat 1 according to one embodiment of the invention is the exhaust gas 40 discharged from an internal combustion engine.

As illustrated in FIG. 7, the exhaust gas 40 discharged from an internal combustion engine is introduced into the catalytic converter 100 through a pipe 20A connected to one end of the catalytic converter 100. The exhaust gas 40 thus introduced is purified by the catalyst carrier 2, and a purified exhaust gas 40A is discharged from the other end of the catalytic converter 100.

The temperature of the exhaust gas 40 that passes through the catalyst carrier 2 included in the catalytic converter 100 may reach about 1000° C. Specifically, the catalyst carrier 2 is exposed to the exhaust gas 40A having a temperature of about 1000° C. or less when the catalytic converter 100 is used for a car that runs on gasoline, for example. The catalytic converter holding mat 1 that comes in contact with the catalyst carrier 2 is also exposed to a high temperature in the same manner as the catalyst carrier 2. In particular, the side of the catalytic converter holding mat 1 that comes in contact with the catalyst carrier 2 is exposed to a high temperature (e.g., about 1000° C.) that is approximately equal to the temperature of the exhaust gas 40 discharged from an internal combustion engine.

When the catalytic converter 100 is used for an automobile, equipment and the like positioned around the catalytic converter 100 may be formed using a member (e.g., resin or rubber) that is susceptible to heat in order to meet a demand for a reduction in weight and the like. Since it is desired to effectively utilize the space inside the engine room from the viewpoint of automotive design, the catalytic converter 100 may be positioned close to such equipment and the like. Therefore, it is particularly desired to reduce the amount of heat released from the catalytic converter 100.

The effects of heat on equipment and the like positioned around the catalytic converter 100 may be reduced by providing the catalytic converter holding mat 1 with a heat insulation capability. However, since glass fibers and the like that have high heat insulation effects and are desired for the catalytic converter holding mat 1 have a high thermal shrinkage ratio (more than 1%) in the usage temperature range, it is difficult to retain the catalyst carrier 2 inside the casing 3 when using such a material alone. Specifically, a material (e.g., glass fibers) that exhibits low heat resistance undergoes a thermal shrinkage of more than 1% when exposed directly to a temperature of 1000° C., and cannot provide a retention capability required for the catalytic converter holding mat 1. Therefore, a catalytic converter holding mat is normally formed only of inorganic fibers having a thermal shrinkage ratio of 1% or less at 1000° C. (i.e., the temperature of the exhaust gas 40A) in order to prevent a decrease in the capability to retain the catalyst carrier 2 even at a temperature of 1000° C.

The catalytic converter holding mat 1 according to one embodiment of the invention is used to prevent leakage of the exhaust gas 40 through the gap between the catalyst carrier 2 and the casing 3 when the catalyst carrier 2 is provided inside the casing 3, and protect the catalyst carrier 2 from vibrations applied from the outside. The catalytic converter holding mat 1 according to one embodiment of the invention also exhibits a heat insulation capability for suppressing radiation of heat to an area around to the installation area of the catalytic converter 100.

Specifically, the catalytic converter holding mat 1 according to one embodiment of the invention is provided in the gap between the tubular catalyst carrier 2 and the casing 3 that houses the catalyst carrier 2, and includes the retaining section 10 that is formed of the first inorganic fibers having a thermal shrinkage ratio at 1000° C. of 1% or less, and the insulation section 11 that is disposed adjacent to the retaining section 10, and formed of the second inorganic fibers having a thermal shrinkage ratio at 1000° C. of more than 1%. The above configuration makes it possible to provide a catalytic converter holding mat that is inexpensive and exhibits excellent heat insulation capability by utilizing a heat insulating material formed of the second inorganic fibers that are inexpensive, exhibit an excellent heat insulation capability, and have been considered to be unsuitable for the catalytic converter holding mat due to a high thermal shrinkage ratio of more than 1%.

The retaining section 10 included in the catalytic converter holding mat 1 according to one embodiment of the invention may be provided to come in contact with the outer side of the catalyst carrier 2 and the inner side of the casing 3, and cover the entire circumferential surface of part of the outer side of the catalyst carrier 2 in the axial direction. The insulation section 11 may be provided to come in contact with the outer side of the catalyst carrier 2 and the inner side of the casing 3, and cover the entire circumferential surface of part of the outer side of the catalyst carrier 2 in the axial direction. In the catalytic converter 100, the retaining section 10 included in the catalytic converter holding mat 1 retains the entire circumferential surface of part of the outer side of the catalyst carrier 2 inside the casing 3.

The retaining section 10 and the insulation section 11 included in the catalytic converter holding mat 1 according to one embodiment of the invention are described in detail below.

The retaining section 10 is described below. The basis weight of the retaining section 10 included in the catalytic converter holding mat 1 is set so that the bulk density of the retaining section 10 is within the range described below when the retaining section 10 is incorporated in the catalytic converter 100. The basis weight of the retaining section 10 varies depending on the thickness of the retaining section 10, but is preferably 400 to 6500 g/m$^2$, more preferably 600 to 4000 g/m$^2$, and still more preferably 800 to 3000 g/m$^2$. If the basis weight of the retaining section 10 included in the catalytic converter holding mat 1 is less than 400 g/m$^2$, the retaining section 10 may exhibit a decreased retention capability when the retaining section 10 is incorporated in the catalytic converter 100. If the basis weight of the retaining section 10 included in the catalytic converter holding mat 1 exceeds 6500 g/m$^2$, the fibers that form the retaining section 10 may break when the retaining section 10 is incorporated in the catalytic converter 100.

The bulk density of the retaining section 10 when the catalytic converter holding mat 1 is incorporated in the catalytic converter 100 may be optimized depending on the material that forms the retaining section 10 and the desired heat insulation temperature (maximum temperature) so that the thermal conductivity becomes a minimum. The bulk density of the retaining section 10 is preferably 0.20 to 0.65 g/cm$^3$, more preferably 0.25 to 0.55 g/cm$^3$, and still more preferably 0.30 to 0.40 g/cm$^3$. If the bulk density of the retaining section 10 included in the catalytic converter 100 is less than 0.20 g/cm$^3$, the retention capability may deteriorate. If the bulk density of the retaining section 10 included in the catalytic converter 100 exceeds 0.65 g/cm$^3$, the fibers that form the retaining section 10 may break.

When a high-temperature gas (exhaust gas 40) passes through the catalyst carrier 2, the temperature of the outer side of the catalyst carrier 2 increases to a temperature approximately equal to that of the exhaust gas 40. Specifically, the side of the catalytic converter holding mat 1 that comes in contact with the catalyst carrier 2 is exposed to a temperature (heat) of about 1000° C. when the catalytic converter 100 is used for a car that runs on gasoline. Therefore, it is necessary to form the retaining section 10 using the first inorganic fibers having a thermal shrinkage ratio at 1000° C. of 1% or less in order to improve the reliability of the catalytic converter holding mat 1. It is preferable that the first inorganic fibers that form the retaining section 10 have a thermal shrinkage ratio at 1100° C. of 1% or less. It is particularly preferable that the first inorganic fibers that form the retaining section 10 have a thermal shrinkage ratio at 1300° C. of 1% or less.

The lower limit of the thermal shrinkage ratio at 1000° C. of the first inorganic fibers that form the retaining section 10 is not particularly limited as long as the performance of the catalytic converter holding mat 1 is not significantly impaired. For example, the lower limit of the thermal shrinkage ratio at 1000° C. of the first inorganic fibers may be 0.01% or more. The lower limit of the thermal shrinkage ratio at 1100° C. or 1300° C. of the first inorganic fibers may be 0.01% or more, for example.

The first inorganic fibers are described in more detail below. The first inorganic fibers that form the retaining section 10 may be selected from the group consisting of alumina fibers, mullite fibers, and mixed fibers thereof. The average fiber diameter of the first inorganic fibers is preferably 3 to 13 μm, for example. Fibers selected from the group consisting of alumina fibers, mullite fibers, and mixed fibers thereof have a thermal shrinkage ratio at 1100° C. or 1300° C. of 1% or less.

The alumina fibers are polycrystalline fibers that include alumina ($Al_2O_3$) as the main component. It is preferable that the alumina fibers have an alumina ($Al_2O_3$) content of 90 mass % or more, for example.

The mullite fibers are polycrystalline'fibers that include alumina ($Al_2O_3$) and silica ($SiO_2$) as the main components. It is preferable that the mullite fibers have a total content of alumina ($Al_2O_3$) and silica ($SiO_2$) of 90 mass % or more, for example. The mass ratio "alumina ($Al_2O_3$)/silica ($SiO_2$)" in the mullite fibers is preferably 70/30 to 80/20.

The first inorganic fibers that form the retaining section 10 may be mixed fibers prepared by mixing the alumina fibers and the mullite fibers in a given ratio.

The first inorganic fibers that form the retaining section 10 may be inorganic fibers prepared by heating and shrinking fibers selected from the group consisting of aluminosilicate fibers, silica fibers, soluble fibers, and mixed fibers of two or more fibers among these fibers in advance. Inorganic fibers prepared by heating and shrinking fibers selected from the group consisting of aluminosilicate fibers, silica fibers, soluble fibers, and mixed fibers of two or more fibers among these fibers in advance have a thermal shrinkage ratio at 1000° C. of 1% or less. The lower limit of the thermal shrinkage ratio is not particularly limited, but may be 0.01% or more, for example. The heating temperature may be 1100° C. or more, for example. The heating time may be 10 minutes or more, for example.

The aluminosilicate fibers are amorphous fibers that include alumina ($Al_2O_3$) and silica ($SiO_2$) as the main components. The mass ratio "alumina ($Al_2O_3$)/silica ($SiO_2$)" in the aluminosilicate fibers is preferably 60/40 to 40/60. The aluminosilicate fibers show a change in shape due to thermal shrinkage when heated at a temperature of 1100° C. or more. Since a change in shape due to thermal shrinkage is irreversible, the aluminosilicate fibers that have been heated have a thermal shrinkage ratio at 1000° C. of 1% or less.

The silica fibers are amorphous fibers that include silica ($SiO_2$) as the main component. It is preferable that the silica fibers have a silica ($SiO_2$) content of 90 mass % or more, for example. For example, the silica fibers may be produced by subjecting glass fibers to an acid treatment to remove the alkaline component and increase the silica content. The silica fibers show a change in shape when heated at a temperature of 1100° C. or more since fine voids formed by the acid treatment performed during the production process are eliminated due to thermal shrinkage. Since a change in shape due to thermal shrinkage is irreversible, the silica fibers that have been heated have a thermal shrinkage ratio at 1000° C. of 1% or less.

The soluble fibers are artificial amorphous fibers that are provided with biosolubility, and include $SiO_2$—CaO—MgO as the main components. The soluble fibers are not particularly limited as long as the soluble fibers exhibit biosolubility (biodegradability). For example, the soluble fibers may be inorganic fibers having a physiological saline dissolution ratio (dissolution rate) at 40° C. of 1% or more, and a thermal shrinkage ratio of 5% or less when heated at 1000° C. for 8 hours. For example, alkaline-earth metal silicate fibers having a total content of CaO and MgO of 20 to 40 mass % and an $SiO_2$ content of 60 to 80 mass %, may be used. The soluble fibers show a change in shape due to thermal shrinkage when heated at a temperature of 1100° C. or more. Since a change in shape due to thermal shrinkage is irreversible, the soluble fibers that have been heated have a thermal shrinkage ratio at 1000° C. of 1% or less.

The physiological saline dissolution ratio of the soluble fibers is measured as described below, for example. Specifically, a conical flask (volume: 300 ml) is charged with 1 g of a sample prepared by grinding the soluble fibers to a dimension of 200 mesh or less, and 150 ml of physiological saline, and placed in an incubator at 40° C. Horizontal vibrations are applied to the conical flask at 120 rpm for 50 hours, followed by filtration. The elements included in the filtrate are quantitatively determined using an ICP optical emission spectrometer. The solubility that indicates the ratio of the content of elements eluted from the sample into the filtrate (i.e., the weight loss percentage of the sample due to dissolution) is calculated based on the quantitative content of the elements, and the composition and the weight of the sample.

The insulation section 11 is described below. The bulk density of the insulation section 11 when the insulation section 11 is incorporated in the catalytic converter 100 may be optimized depending on the material that forms the insulation section 11 and the desired heat insulation temperature (maximum temperature) so that the thermal conductivity becomes a minimum. It is preferable that the bulk density of the insulation section 11 be lower than that of the retaining section 10. When the bulk density of the insulation section 11 is lower than that of the retaining section 10, the amount of air layers of the catalytic converter holding mat 1 increases, and the heat insulation capability is further improved. The bulk density of the insulation section 11 when the insulation section 11 is incorporated in the catalytic converter 100 is 0.10 g/cm$^3$ or more and less than 0.40 g/cm$^3$, and preferably 0.10 to 0.30 g/cm$^3$. The bulk density of the insulation section 11 is particularly preferably 0.10 to 0.25 g/cm$^3$. When the bulk density of the insulation section 11 included in the catalytic converter holding mat 1 is lower than that of the retaining section 10, the weight of the catalytic converter holding mat 1 can be reduced. If the bulk density of the insulation section 11 included in the catalytic converter holding mat 1 is less than 0.10 g/cm$^3$, an increase in thermal conductivity may occur due to a decrease in density.

It is preferable that the basis weight of the insulation section 11 included in the catalytic converter holding mat 1 be lower than that of the retaining section 10 so that the insulation section 11 have a bulk density within the above range. When the basis weight of the insulation section 11 is lower than that of the retaining section 10, the amount of air layers of the catalytic converter holding mat 1 increases, and the heat insulation capability is further improved. The basis weight of the insulation section 11 is set so that the bulk density of the insulation section 11 is within the above range when the insulation section 11 is incorporated in the catalytic converter. The basis weight of the insulation section 11 included in the catalytic converter holding mat 1 varies depending on the thickness of the insulation section 11, but is normally 200 g/m$^2$ or more and less than 4000 g/m$^2$, and preferably 400 g/m$^2$ to 3500 g/m$^2$. The basis weight of the insulation section 11 is particularly preferably 800 g/m$^2$ to 2500 g/m$^2$. When the basis weight of the insulation section 11 included in the catalytic converter holding mat 1 is lower than that of the retaining section 10, the weight of the catalytic converter holding mat 1 can be reduced. If the basis weight of the insulation section 11 included in the catalytic converter holding mat 1 is less than 200 g/m$^2$, an increase in thermal conductivity may occur due to a decrease in density when the insulation section 11 is incorporated in the catalytic converter 100.

The insulation section 11 is formed of the second inorganic fibers having a thermal shrinkage ratio at 1000° C. of more than 1%. It is preferable that the second inorganic fibers that form the insulation section 11 have a thermal shrinkage ratio at 800° C. of more than 1%. It is more preferable that the second inorganic fibers that form the insulation section 11 have a thermal shrinkage ratio at 600° C. of more than 1%. It is particularly preferable that the second inorganic fibers that form the insulation section 11 have a thermal shrinkage ratio at 500° C. of more than 1%. It is possible to provide a catalytic converter holding mat that is inexpensive and exhibits excellent heat insulation capability by utilizing the second inorganic fibers having a thermal shrinkage ratio at 1000° C. or less of more than 1% for the catalytic converter holding mat 1.

The upper limit of the thermal shrinkage ratio at 1000° C. of the second inorganic fibers that form the insulation section 11 is not particularly limited as long as the performance of the catalytic converter holding mat 1 is not significantly impaired. For example, the upper limit of the thermal shrinkage ratio at 1000° C. of the second inorganic fibers may be 5.0% or less. The upper limit of the thermal shrinkage ratio at 1000° C. of the second inorganic fibers that form the insulation section 11 may be 15.0% or less. The upper limit of the thermal shrinkage ratio at 800° C., 600° C., or 500° C. of the second inorganic fibers may be 5.0% or less or 15.0% or less, for example.

The insulation section 11 included in the catalytic converter holding mat 1 may be provided so as not to come in contact with the outer side of the catalyst carrier 2. The insulation section 11 included in the catalytic converter holding mat 1 may be provided to come in contact with the inner side of the casing 3. When the insulation section 11 included in the catalytic converter holding mat 1 is provided to come in contact with the inner side of the casing 3, an air layer is not formed between the catalytic converter holding mat 1 and the casing 3. Specifically, since such an air layer causes heat convection, and increase the surface temperature of the catalytic converter 100, the heat insulation effect may deteriorate. Therefore, the heat insulation effect can be improved by providing the insulation section 11 included in the catalytic converter holding mat 1 to come in contact with the inner side of the casing 3.

The second inorganic fibers are described in more detail below. The second inorganic fibers that form the insulation section 11 may be selected from the group consisting of glass fibers, rock wool, and mixed fibers of two or more fibers among these fibers.

The glass fibers are prepared by melting and drawing non-alkali glass such as quartz glass. The composition of the glass fibers is not particularly limited. Examples of the glass fibers include E-glass fibers that include 52 to 56 mass % of $SiO_2$, 12 to 16 mass % of $Al_2O_3$, 0 to 5 mass % of MgO, 16 to 25 mass % of CaO, 5 to 10 mass % of $B_2O_3$, 0 to 1 mass % of $Na_2O$ and/or $K_2O$, and 0 to 1 mass % of $TiO_2$, T-glass fibers that include 62 to 65 mass % of $SiO_2$, 20 to 25 mass % of $Al_2O_3$, 10 to 15 mass % of MgO, 0 to 1 mass % of CaO, 0 to 1 mass % of $B_2O_3$, 0 to 1 mass % of $Na_2O$ and/or $K_2O$, and 0 to 1 mass % of $TiO_2$, NCR-glass fibers that include 56 to 62 mass % of $SiO_2$, 9 to 15 mass % of $Al_2O_3$, 0 to 5 mass % of MgO, 17 to 25 mass % of CaO, 0 to 1 mass % of $B_2O_3$, 0 to 1 mass % of $Na_2O$ and/or $K_2O$, and 0 to 4 mass % of $TiO_2$, and C-glass fibers (borosilicate glass fibers) that include 60 to 67 mass % of $SiO_2$, 2 to 6 mass % of $Al_2O_3$, 10 to 20 mass % of MgO and/or CaO, 0 to 8 mass % of $B_2O_3$, and 8 to 15 mass % of $Na_2O$ and/or $K_2O$, and the like. The glass fibers are also referred to as glass wool, and classified into a short glass fiber and a continuous glass fiber (long glass fiber). A short glass fiber or a continuous glass fiber (long glass fiber) may be used as the glass fibers.

The rock wool consists of artificial mineral fibers that include silicon oxide and calcium oxide as the main components. The rock wool is produced by mixing lime or the like with basalt, iron furnace slag, or the like, and melting the mixture at a high temperature. The rock wool is a fibrous product that normally includes 35 to 45 mass % of $SiO_2$, 10 to 20 mass % of $Al_2O_3$, 4 to 8 mass % of MgO, 20 to 40 mass % of CaO, 0 to 10 mass % of $Fe_2O_3$, and 0 to 4 mass % of MnO. Note that the composition varies depending on the raw materials.

The second inorganic fibers that form the insulation section 11 may be fibers selected from the group consisting of aluminosilicate fibers, silica fibers, soluble fibers, and mixed fibers of two or more fibers among these fibers. Fibers selected from the group consisting of aluminosilicate fibers, silica fibers, soluble fibers, and mixed fibers of two or more fibers among these fibers that are not heated and shrunk in advance have a thermal shrinkage ratio at 1000° C. of more than 1%.

The aluminosilicate fibers are amorphous fibers that include alumina ($Al_2O_3$) and silica ($SiO_2$) as the main components. The mass ratio "alumina ($Al_2O_3$)/silica ($SiO_2$)" in the aluminosilicate fibers is preferably 60/40 to 40/60.

The silica fibers are amorphous fibers that include silica ($SiO_2$) as the main component. It is preferable that the silica fibers have a silica ($SiO_2$) content of 90 mass % or more, for example. For example, the silica fibers may be produced by subjecting glass fibers to an acid treatment to remove the alkaline component and increase the silica content.

The soluble fibers are artificial amorphous fibers that are provided with biosolubility, and include $SiO_2$—CaO—MgO as the main components. The soluble fibers are not particularly limited as long as the soluble fibers exhibit biosolubility (biodegradability). For example, the soluble fibers may be inorganic fibers having a physiological saline dissolution ratio (dissolution rate) at 40° C. of 1% or more, and a thermal shrinkage ratio of 5% or less when heated at 1000° C. for 8 hours. For example, alkaline-earth metal silicate fibers having a total content of CaO and MgO of 20 to 40 mass % and an $SiO_2$ content of 60 to 80 mass %, may be used.

The physiological saline dissolution ratio of the soluble fibers is measured as described below, for example. Specifically, a conical flask (volume: 300 ml) is charged with 1 g of a sample prepared by grinding the soluble fibers to a dimension of 200 mesh or less, and 150 ml of physiological saline, and placed in an incubator at 40° C. Horizontal vibrations are applied to the conical flask at 120 rpm for 50 hours, followed by filtration. The elements included in the filtrate are quantitatively determined using an ICP optical emission spectrometer. The solubility that indicates the ratio of the content of elements eluted from the sample into the filtrate (i.e., the weight loss percentage of the sample due to dissolution) is calculated based on the quantitative content of the elements, and the composition and the weight of the sample.

Figure 8:
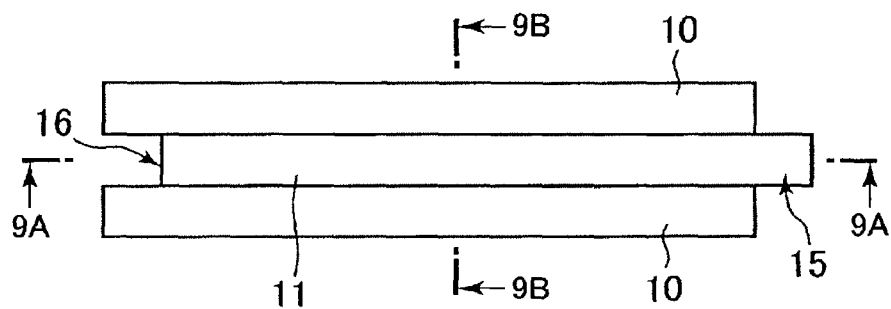
FIG. 8 is a plane view illustrating another example of a catalytic converter holding mat 1 according to one embodiment of the invention.
Figure 9A:
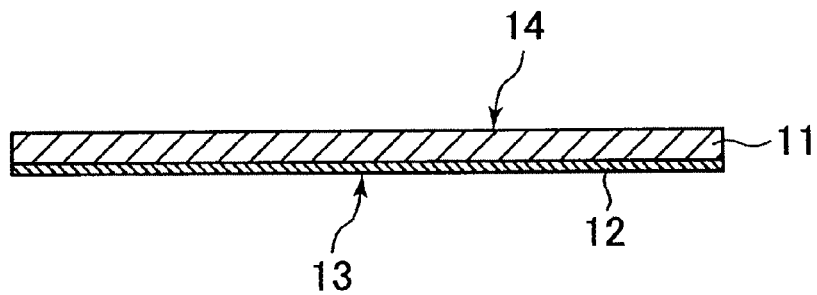
FIG. 9A is a cross-sectional view taken along the line 9A-9A illustrated in FIG. 8.
Figure 9B:
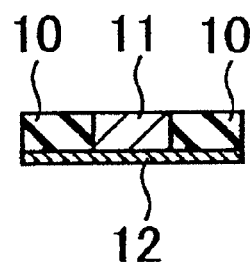
FIG. 9B is a cross-sectional view taken along the line 9B-9B illustrated in FIG. 8.

Another example of the catalytic converter holding mat 1 according to one embodiment of the invention is described below. FIG. 8 is a plan view illustrating another example of the catalytic converter holding mat 1 according to one embodiment of the invention. FIG. 9A is a cross-sectional view taken along the line 9A-9A illustrated in FIG. 8. FIG. 9B is a cross-sectional view taken along the line 9B-9B illustrated in FIG. 8. The catalytic converter holding mat 1 illustrated in FIG. 8 further includes a protecting section 12 that is disposed between the insulation section 11 and the outer side of the catalyst carrier 2. Specifically, the catalytic converter holding mat 1 may further include the protecting section 12 that is stacked to extend over the retaining section 10 and the insulation section 11.

When the catalytic converter holding mat 1 is wound around the outer side of the catalyst carrier 2, the side 13 of the catalytic converter holding mat 1 that comes in contact with the outer side of the catalyst carrier 2 is exposed directly to heat released from the outer side of the catalyst carrier 2. For example, when the insulation section 11 that is formed of the second inorganic fibers having a thermal shrinkage ratio at 1000° C. of more than 1% is exposed directly to heat released from the outer side of the catalyst carrier 2, the insulation section 11 may show a change in shape, and the heat insulation capability may deteriorate.

When the protecting section 12 that prevents a situation in which the insulation section 11 shows a change in shape due to heat is provided between the insulation section 11 and the outer side of the catalyst carrier 2, it is possible to suppress a deterioration in the heat insulation capability of the insulation section 11 that is formed of the second inorganic fibers having a thermal shrinkage ratio at 1000° C. of more than 1%.

The insulation section 11 and the protecting section 12 included in the catalytic converter holding mat 1 according to one embodiment of the invention may have a thermal conductivity lower than that of the retaining section 10. The above configuration further improves the heat insulation capability of the catalytic converter holding mat 1 according to one embodiment of the invention.

The protecting section 12 is described in detail below. The protecting section 12 included in the catalytic converter holding mat 1 is disposed between the insulation section 11 and the outer side of the catalyst carrier 2, and insulates heat released from the outer side of the catalyst carrier 2. The protecting section 12 included in the catalytic converter holding mat 1 may be provided to come in contact with the insulation section 11 and/or the catalyst carrier 2.

When the protecting section 12 included in the catalytic converter holding mat 1 is provided to come in contact with the insulation section 11 and/or the outer side of the catalyst carrier 2, an air layer is not formed between the catalytic converter holding mat 1 and the insulation section 11 and/or the catalyst carrier 2. Specifically, since such an air layer causes heat convection, and increase the surface temperature of the catalytic converter 100, the heat insulation effect may deteriorate. Therefore, the heat insulation effect can be improved by providing the protecting section 12 included in the catalytic converter holding mat 1 to come in contact with the insulation section 11 and/or the outer side of the catalyst carrier 2.

The bulk density of the protecting section 12 when the protecting section 12 is incorporated in the catalytic converter 100 may be optimized depending on the material that forms the protecting section 12 and the desired heat insulation temperature (maximum temperature) so that the thermal conductivity becomes a minimum. The bulk density of the protecting section 12 is not particularly limited, but it may be 0.20 to 0.65 g/cm$^3$, or 0.25 to 0.55 g/cm$^3$, or 0.30 to 0.40 g/cm$^3$. The bulk density of the protecting section 12 included in the catalytic converter holding mat 1 may be equal to or lower than that of the retaining section 10. When the bulk density of the protecting section 12 is equal to or lower than that of the retaining section 10, the heat insulation capability of the catalytic converter holding mat 1 is further improved. When the bulk density of the protecting section 12 included in the catalytic converter holding mat 1 is equal to or lower than that of the retaining section 10, the weight of the catalytic converter holding mat 1 can be reduced.

The protecting section 12 is described below. The protecting section 12 may be formed of third inorganic fibers having a thermal shrinkage ratio at 1000° C. of 1% or less in order to improve the reliability of the catalytic converter holding mat 1.

The lower limit of the thermal shrinkage ratio at 1000° C. of the third inorganic fibers that form the protecting section 12 is not particularly limited as long as the performance of the catalytic converter holding mat 1 is not significantly impaired. For example, the lower limit of the thermal shrinkage ratio at 1000° C. of the third inorganic fibers may be 0.01% or more. The lower limit of the thermal shrinkage ratio at 1100° C. or 1300° C. of the third inorganic fibers may be 0.01% or more, for example.

The third inorganic fibers are described in detail below. The third inorganic fibers that form the protecting section 12 may be selected from the group consisting of alumina fibers, mullite fibers, and mixed fibers thereof. The average fiber diameter of the third inorganic fibers is preferably 3 to 13 μm, for example. Fibers selected from the group consisting of alumina fibers, mullite fibers, and mixed fibers thereof have a thermal shrinkage ratio at 1100° C. or 1300° C. of 1% or less.

The third inorganic fibers that form the protecting section 12 may be inorganic fibers prepared by heating and shrinking fibers selected from the group consisting of aluminosilicate fibers, silica fibers, soluble fibers, and mixed fibers of two or more fibers among these fibers in advance. Inorganic fibers prepared by heating and shrinking fibers selected from the group consisting of aluminosilicate fibers, silica fibers, soluble fibers, and mixed fibers of two or more fibers among these fibers in advance have a thermal shrinkage ratio at 1000° C. of 1% or less. The lower limit of the thermal shrinkage ratio is not particularly limited, but may be 0.01% or more, for example. The heating temperature may be 1100° C. or more, for example. The heating time may be 10 minutes or more, for example.

The aluminosilicate fibers are amorphous fibers that include alumina ($Al_2O_3$) and silica ($SiO_2$) as the main components. The mass ratio "alumina ($Al_2O_3$)/silica ($SiO_2$)" in the aluminosilicate fibers is preferably 60/40 to 40/60. The aluminosilicate fibers show a change in shape due to thermal shrinkage when heated at a temperature of 1100° C. or more. Since a change in shape due to thermal shrinkage is irreversible, the aluminosilicate fibers that have been heated have a thermal shrinkage ratio at 1000° C. of 1% or less.

The silica fibers are amorphous fibers that include silica ($SiO_2$) as the main component. It is preferable that the silica fibers have a silica ($SiO_2$) content of 90 mass % or more, for example. For example, the silica fibers may be produced by subjecting glass fibers to an acid treatment to remove the alkaline component and increase the silica content. The silica fibers show a change in shape when heated at a temperature of 1100° C. or more since fine voids formed by the acid treatment performed during the production process are eliminated due to thermal shrinkage. Since a change in shape due to thermal shrinkage is irreversible, the silica fibers that have been heated have a thermal shrinkage ratio at 1000° C. of 1% or less.

The soluble fibers are artificial amorphous fibers that are provided with biosolubility, and include $SiO_2$—CaO—MgO as the main components. The soluble fibers are not particularly limited as long as the soluble fibers exhibit biosolubility (biodegradability). For example, the soluble fibers may be inorganic fibers having a physiological saline dissolution ratio (dissolution rate) at 40° C. of 1% or more, and a thermal shrinkage ratio of 5% or less when heated at 1000° C. for 8 hours. For example, alkaline-earth metal silicate fibers having a total content of CaO and MgO of 20 to 40 mass and an $SiO_2$ content of 60 to 80 mass %, may be used. The soluble fibers show a change in shape due to thermal shrinkage when heated at a temperature of 1100° C. or more. Since a change in shape due to thermal shrinkage is irreversible, the soluble fibers that have been heated have a thermal shrinkage ratio at 1000° C. of 1% or less.

The physiological saline dissolution ratio of the soluble fibers is measured as described below, for example. Specifically, a conical flask (volume: 300 ml) is charged with 1 g of a sample prepared by grinding the soluble fibers to a dimension of 200 mesh or less, and 150 ml of physiological saline, and placed in an incubator at 40° C. Horizontal vibrations are applied to the conical flask at 120 rpm for 50 hours, followed by filtration. The elements included in the filtrate are quantitatively determined using an ICP optical emission spectrometer. The solubility that indicates the ratio of the content of elements eluted from the sample into the filtrate (i.e., the weight loss percentage of the sample due to dissolution) is calculated based on the quantitative content of the elements, and the composition and the weight of the sample.

The protecting section 12 may be provided integrally with the retaining section 10. Specifically, when the protecting section 12 and the retaining section 10 are integrally formed of identical inorganic fibers, and part of the integral structure is positioned between the insulation section 11 and the outer side of the catalyst carrier 2, the part of the integral structure positioned between the insulation section 11 and the outer side of the catalyst carrier 2 serves as the protecting section 12. In this case, the third inorganic fibers that form the protecting section 12 are identical with the first inorganic fibers.

The protecting section 12 may be formed of a sheet-shaped product (e.g., nonwoven fabric (paper) or woven fabric (cloth)) that is formed of the third inorganic fibers.

Figure 10:
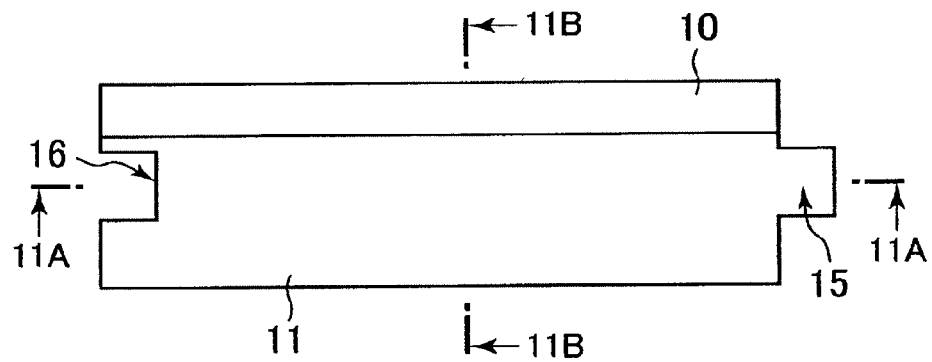
FIG. 10 is a plane view illustrating another example of a catalytic converter holding mat 1 according to one embodiment of the invention.
Figure 11A:
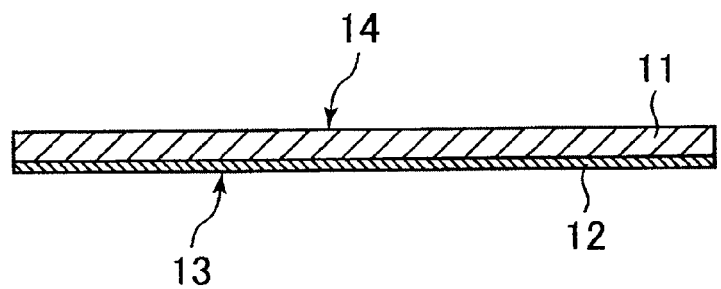
FIG. 11A is a cross-sectional view taken along the line 11A-11A illustrated in FIG. 10.
Figure 11B:
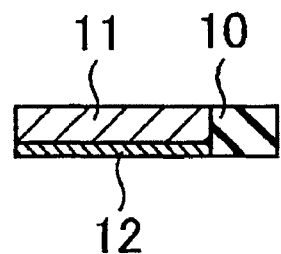
FIG. 11B is a cross-sectional view taken along the line 11B-11B illustrated in FIG. 10.

Another example of the catalytic converter holding mat 1 according to one embodiment of the invention is described below. FIG. 10 is a plan view illustrating another example of the catalytic converter holding mat 1 according to one embodiment of the invention. FIG. 11A is a cross-sectional view taken along the line 11A-11A illustrated in FIG. 10. FIG. 11B is a cross-sectional view taken along the line 11B-11B illustrated in FIG. 10.

The catalytic converter holding mat 1 illustrated in FIG. 10 includes the retaining section 10 that is formed of the first inorganic fibers having a thermal shrinkage ratio at 1000° C. of 1% or less, the retaining section 10 coming in contact with the outer side of the catalyst carrier 2 and the inner side of the casing 3, and being provided to cover the entire circumferential surface of part of the outer side of the catalyst carrier 2 in the axial direction, the insulation section 11 that is formed of the second inorganic fibers having a thermal shrinkage ratio at 1000° C. of more than 1%, the insulation section 11 being provided over at least part of the circumferential surface of part of the catalyst carrier 2 in the axial direction at an interval from the outer side of the catalyst carrier 2, and the protecting section 12 that is formed of the third inorganic fibers having a thermal shrinkage ratio at 1000° C. of 1% or less, the protecting section 12 being disposed between the insulation section and the outer side of the catalyst carrier.

The catalytic converter holding mat 1 illustrated in FIGS. 10, 11A, and 11B may be produced by bonding the retaining section 10, the insulation section 11, and the protecting section 12 that are produced separately, for example.

The protecting section 12 may be provided integrally with the retaining section 10. Specifically, when the protecting section 12 and the retaining section 10 are integrally formed of identical inorganic fibers, and part of the integral structure is positioned between the insulation section 11 and the outer side of the catalyst carrier 2, the part of the integral structure positioned between the insulation section 11 and the outer side of the catalyst carrier 2 serves as the protecting section 12. In this case, the third inorganic fibers that form the protecting section 12 are identical with the first inorganic fibers.

Figure 12:
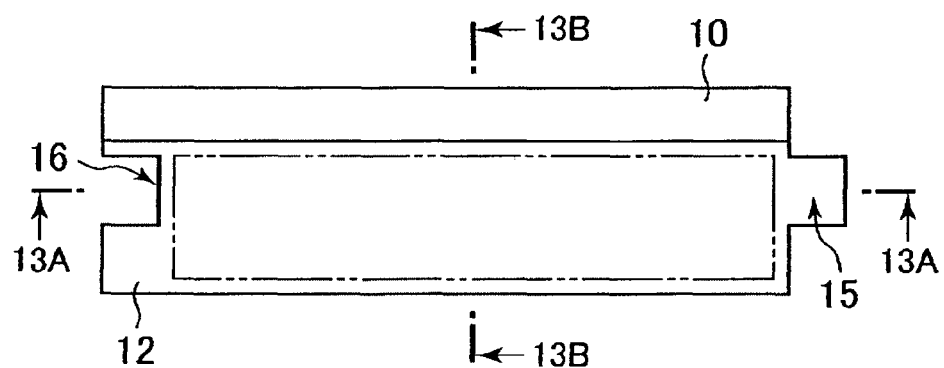
FIG. 12 is a plane view illustrating a further example of a catalytic converter holding mat 1 according to one embodiment of the invention.
Figure 13A:
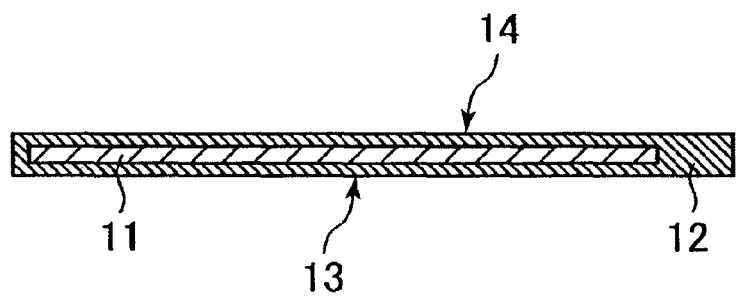
FIG. 13A is a cross-sectional view taken along the line 13A-13A illustrated in FIG. 12.
Figure 13B:
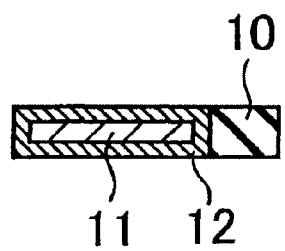
FIG. 13B is a cross-sectional view taken along the line 13B-13B illustrated in FIG. 12.

A further example of the catalytic converter holding mat 1 according to one embodiment of the invention is described below. FIG. 12 is a plan view illustrating a further example of the catalytic converter holding mat 1 according to one embodiment of the invention. FIG. 13A is a cross-sectional view taken along the line 13A-13A illustrated in FIG. 12. FIG. 13B is a cross-sectional view taken along the line 13B-13B illustrated in FIG. 12.

The catalytic converter holding mat 1 illustrated in FIG. 12 includes a first member that includes the retaining section 10 that comes in contact with the outer side of the catalyst carrier 2 and the inner side of the casing 3, and is provided to cover the entire circumferential surface of part of the outer side of the catalyst carrier 2 in the axial direction, and a second member that includes the insulation section 11 and the protecting section 12 that are provided to cover the entire circumferential surface of part of the outer side of the catalyst carrier 2 in the axial direction.

The volume of the insulation section 11 included in the second member may be larger than the volume of the protecting section 12. The volume of the insulation section 11 included in the second member is preferably larger than the volume of the protecting section 12 by a factor of 1.3 or more (more preferably 1.5 or more, and particularly preferably 2.0 or more). This makes it possible to further improve the heat resistance. Moreover, it is possible to further reduce cost.

The thickness of the insulation section 11 included in the second member may be larger than the thickness of the protecting section 12. The thickness of the insulation section 11 included in the second member is preferably larger than the thickness of the protecting section 12 by a factor of 1.3 or more (more preferably 1.5 or more, and particularly preferably 2.0 or more). This makes it possible to further improve the heat resistance. Moreover, it is possible to further reduce cost.

A side 13 (i.e., a side that comes in contact with the catalyst carrier 2) of the catalytic converter holding mat 1 according to one embodiment of the invention illustrated in FIGS. 13A and 13B is formed by the retaining section 10 and the protecting section 12. A side 14 (i.e., a side that comes in contact with the casing 3) of the catalytic converter holding mat 1 according to one embodiment of the invention is formed by the retaining section 10 and the protecting section 12. Specifically, the catalytic converter holding mat 1 according to one embodiment of the invention may further include the protecting section 12 that is disposed between the insulation section 11 and the inner side of the casing 3.

The casing 3 used for the catalytic converter 100 may be formed of a metal such as stainless steel (SUS) as described above. When the casing 3 is formed of a metal, the temperature of the casing 3 of the catalytic converter 100 may locally increase since a metal has high thermal conductivity. In this case, the effects of heat from the casing 3 on the insulation section 11 is reduced by providing the protecting section 12 between the insulation section 11 and the inner side of the casing 3. The protecting section 12 included in the catalytic converter holding mat 1 may be provided to cover the entirety of the insulation section 11.

The protecting section 12 may be provided integrally with the retaining section 10. Specifically, when the protecting section 12 and the retaining section 10 are integrally formed of identical inorganic fibers, and part of the integral structure is provided to cover the insulation section 11, the part of the integral structure provided to cover the insulation section 11 serves as the protecting section 12. In this case, the third inorganic fibers that form the protecting section 12 are identical with the first inorganic fibers.

When the insulation section 11 is covered with the protecting section 12 that is formed of the third inorganic fibers that are identical with the first inorganic fibers that form the retaining section 10, the catalytic converter holding mat 1 illustrated in FIG. 12 may be produced as described below, for example.

Specifically, an insulation mat is produced that is formed of the insulation section 11 that is formed of the second inorganic fibers having a thermal shrinkage ratio at 1000° C. of more than 1%. The insulation mat may be produced using a known inorganic fiber formed body production method (e.g., dry process or wet process). The insulation mat may be produced using a carding method, a needle punch method, an airlaying method, a spunlacing method, a steam jet method, a sucking dehydration/forming method, a sheet making method, or the like. An insulation mat that is formed of the second inorganic fibers may be provided as the insulation mat.

Separately from the above mentioned process in which an insulating mat is obtained by the production, preparation or the like of an insulating mat, a slurry is prepared that includes the first inorganic fibers having a thermal shrinkage ratio at 1000° C. of 1% or less (or the third inorganic fibers that are identical with the first inorganic fibers) that are used to form the retaining section 10 and the protecting section 12. The slurry may include an organic binder. An acrylic emulsion prepared by emulsifying (O/W) an acrylic resin may be used as the organic binder.

After placing the insulation mat (insulation section) in a mold, the slurry prepared by the above slurry preparation step is provided to cover the insulation mat placed in the mold, and subjected to dehydration molding to obtain a composite mat in which the insulation section is covered with the first inorganic fibers. The mold may be a tabular mold, for example. The following description is given taking the case of using a tabular mold as an example. The placement position of the insulation mat in the mold is determined based on the position of the insulation section 11 in the catalytic converter holding mat 1, and the placement position of the slurry in the mold is determined based on the position of the retaining section 10 and the protecting section 12 in the catalytic converter holding mat 1. After placing the insulation mat at a specific position of the tabular mold, the slurry is poured into the tabular mold, and subjected to dehydration molding to obtain a composite mat in which the insulation section 11 is covered with the first inorganic fibers (or the third inorganic fibers that are identical with the first inorganic fibers).

The resulting composite mat may be dried to obtain the catalytic converter holding mat 1. In this case, the tabular mold has the same shape as that of the catalytic converter holding mat 1. Alternatively, the composite mat may be dried, and stamped to have a specific shape (i.e., the shape of the catalytic converter holding mat 1) to obtain the catalytic converter holding mat 1 illustrated in FIG. 12. In this case, the tabular mold has a shape differing from the shape of the catalytic converter holding mat It is preferable that the catalytic converter holding mat 1 according to one embodiment of the invention have a uniform thickness within a range of ±25%.

The invention claimed is:

1. A catalytic convertor holding mat that is to be located in a gap between a tubular catalyst carrier and a casing that houses the catalyst carrier, the catalytic converter holding mat comprising:
   a retaining section comprising first inorganic fibers having a thermal shrinkage ratio at 1000° C. of 1% or less, and extending in a longitudinal direction of the holding mat; and
   an insulation section laterally adjacent to the retaining section in a plane view of the holding mat; and consisting of second inorganic fibers having a thermal shrinkage ratio at 1000° C. of more than 1%, and extending in the longitudinal direction of the holding mat.

2. The catalytic converter holding mat according to claim 1,
   wherein the first inorganic fibers having a thermal shrinkage ratio at 1000° C. of 1% or less are selected from the group consisting of alumina fibers, mullite fibers, and mixtures thereof.

3. The catalytic converter holding mat according to claim 1,
   wherein the first inorganic fibers having a thermal shrinkage ratio at 1000° C. of 1% or less are fibers prepared by heating and shrinking fibers selected from the group consisting of aluminosilicate fibers, silica fibers, soluble fibers, and mixtures of two or more of said fibers.

4. The catalytic converter holding mat according to claim 1,
   wherein the second inorganic fibers having a thermal shrinkage ratio at 1000° C. of more than 1% are selected from the group consisting of glass fibers, rock wool, aluminosilicate fibers, silica fibers, soluble fibers, and mixtures of two or more of said fibers.

5. The catalytic converter holding mat according to claim 1, further comprising:
   a. protecting section that is to be located between the insulation section and an outer side of the catalyst carrier.

6. The catalytic converter holding mat according to claim 5,
   wherein the protecting section comprises third inorganic fibers having a thermal shrinkage ratio at 1000° C. of 1% or less.

7. The catalytic converter holding mat according to claim 6,
   wherein the third inorganic fibers having a thermal shrinkage ratio at 1000° C. of 1% or less are selected from the group consisting of alumina fibers, mullite fibers, and mixtures thereof.

8. The catalytic converter holding mat according to claim 6,
   wherein the third inorganic fibers having a thermal shrinkage ratio at 1000° C. of 1% or less are fibers prepared by heating and shrinking fibers selected from the group consisting of aluminosilicate fibers, silica fibers, soluble fibers, and mixtures of two or more of said fibers.

9. The catalytic converter holding mat according to claim 5,
   wherein the insulation section is covered with the protecting section.

10. A method for producing the catalytic converter holding mat of claim 1, said method comprising:
    producing an insulation section comprising second inorganic fibers having a thermal shrinkage ratio at 1000° C. of more than 1%;
    preparing a slurry that comprises first inorganic fibers having a thermal shrinkage ratio at 1000° C. of 1% or less;
    placing the insulation section in a mold, covering the insulation section in the mold with the slurry, and dehydration molding the slurry covered insulation section to obtain to composite mat wherein the insulation section is covered with the first inorganic fibers; and drying the composite mat.

11. The catalytic converter holding mat according to claim 1,
wherein the retaining section is for covering an entire circumferential surface of a part of an outer surface of the catalyst carrier in an axial direction; and
the insulation section is for covering an entire circumferential surface of a part of an outer surface of the catalyst carrier in an axial direction.

12. The catalytic converter holding mat according to claim 1, comprising two said retaining sections, and
wherein the insulation section is between said two retaining sections in a plane view of the holding mat.

13. The catalytic converter holding mat according to claim 5,
wherein the protecting section is stacked to extend over the retaining section and the insulation section.

14. The catalytic converter holding mat according to claim 5,
wherein the protecting section is in contact with one surface of the insulation section.

15. A catalytic converter holding mat to be located in a gap between a tubular catalyst carrier and a casing that houses the catalyst carrier, the catalytic converter holding mat comprising:
a retaining section that comprises first inorganic fibers having a thermal shrinkage ratio at 1000° C. of 1% or less, and extending in a longitudinal direction of the holding mat;
an insulation section laterally adjacent to the retaining section in a plane view of the holding mat, and comprising second inorganic fibers having a thermal shrinkage ratio at 1000° C. of more than 1%, and extending in the longitudinal direction of the holding mat; and
a protecting section that is located over only the insulation section so that it will be located between only the insulation section and an outer side of the catalyst carrier.

16. A catalytic converter holding mat that is to be located in a gap between a tubular catalyst carrier and a casing that houses the catalyst carrier, the catalytic converter holding mat comprising:
a retaining section comprising first inorganic fibers having a thermal shrinkage ratio at 1000° C. of 1% or less, and extending in a longitudinal direction of the holding mat;
an insulation section laterally adjacent to the retaining section in a plane view of the holding mat, and comprising second inorganic fibers having a thermal shrinkage ratio at 1,000° C. of more than 1%, and extending in the longitudinal direction of the holding mat; and
a protecting section that is located over the insulation section and is not located over the retaining section so that it will be located, between the insulation section and an outer side of the catalyst carrier and not between the retaining section and the outer side of the catalyst carrier.

17. The catalytic converter holding mat according, to claim 16, wherein the protecting section is located over both surfaces of the insulation section so that it will be located between the insulation section and the outer side of the catalyst carrier and between the insulation section and an inner side of the casing.

18. The catalytic converter holding mat according to claim 16, wherein the protecting section covers the entire insulation section.

19. A catalytic converter holding mat that is to be located in a gap between a tubular catalyst carrier and a casing that houses the catalyst carrier, the catalytic converter holding mat comprising:
a retaining section comprising first inorganic fibers having a thermal shrinkage ratio at 1,000° C. of 1% or less, and extending in a longitudinal direction of the holding mat;
an insulation section laterally adjacent to the retaining section in a plane view of the holding mat, and comprising second inorganic fibers having a thermal shrinkage ratio at 1,000° C. of more than 1%, and extending in the longitudinal direction of the holding mat; and
the insulating section of the mat is embedded entirely within a protecting section, and not within the retaining section of said mat.

* * * * *